US 7,450,260 B2

(12) United States Patent
Takeda et al.

(10) Patent No.: US 7,450,260 B2
(45) Date of Patent: Nov. 11, 2008

(54) PRINTER DRIVER PROGRAM AND PRINTER

(75) Inventors: Kenichi Takeda, Tokyo (JP); Hirofumi Nishiwaki, Tokyo (JP); Nozomi Sawada, Tokyo (JP); Masaki Ohtani, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1000 days.

(21) Appl. No.: 10/804,080

(22) Filed: Mar. 19, 2004

(65) Prior Publication Data
US 2004/0184064 A1 Sep. 23, 2004

(30) Foreign Application Priority Data
Mar. 20, 2003 (JP) ............................. 2003-078788

(51) Int. Cl.
*G06F 15/00* (2006.01)

(52) U.S. Cl. ................ 358/1.15; 358/1.14; 358/1.6; 358/488; 358/452; 380/259; 380/264; 380/278; 380/279; 380/44; 713/160; 713/161; 713/184; 713/191

(58) Field of Classification Search ............. 358/1.14, 358/1.15, 488, 452, 1.6; 380/259, 264, 278, 380/279, 44; 713/160, 161, 184, 191
See application file for complete search history.

(56) References Cited

U.S. PATENT DOCUMENTS

| 5,041,918 A | 8/1991 | Ishida et al. |
|---|---|---|
| 5,402,250 A | 3/1995 | Ishida et al. |
| 5,465,326 A | 11/1995 | Sawada |
| 5,537,221 A | 7/1996 | Sawada |
| 5,557,707 A | 9/1996 | Inoue et al. |
| 5,602,973 A | 2/1997 | Nishiwaki |
| 5,633,730 A | 5/1997 | Sawada et al. |
| 5,633,932 A | 5/1997 | Davis et al. |
| 6,088,568 A | 7/2000 | Ohtani |
| 6,144,818 A | 11/2000 | Ohtani |
| RE37,031 E | 1/2001 | Nishiwaki |
| 6,172,761 B1 | 1/2001 | Ohtani |
| 6,215,977 B1 | 4/2001 | Otani |

(Continued)

FOREIGN PATENT DOCUMENTS

JP 6-124178 5/1994

(Continued)

OTHER PUBLICATIONS http:// www.adobe.co.jp/acrofamily/features/acro_nikkel/page4.html, 2 pages.

*Primary Examiner*—Edward L Coles
*Assistant Examiner*—Chan S Park
(74) *Attorney, Agent, or Firm*—Oblon, Spivak, McClelland, Maier & Neustadt, P.C.

(57) ABSTRACT

In a printer driver that transmits a print data to a printer connected via a network to make a print request, a document password processing unit prompts a user to input a document password for decrypting a PDF document data encrypted by a predetermined application. A print data creating unit creates a print data including the PDF document data encrypted and the document password. The created print data is transmitted to the printer via the network by a host I/F controller and a host I/F.

6 Claims, 13 Drawing Sheets

U.S. PATENT DOCUMENTS

| | | | |
|---|---|---|---|
| 6,229,984 | B1 | 5/2001 | Ohtani |
| 6,711,365 | B2 | 3/2004 | Ohtani |
| 7,003,667 | B1 | 2/2006 | Slick et al. |
| 2002/0184494 | A1 | 12/2002 | Awadalla |
| 2003/0105963 | A1* | 6/2003 | Slick et al. ................. 713/171 |
| 2004/0225890 | A1* | 11/2004 | Kang et al. ................. 713/193 |
| 2006/0044589 | A1* | 3/2006 | Nakagawaji ................ 358/1.14 |

FOREIGN PATENT DOCUMENTS

JP    2001-186358    7/2001

\* cited by examiner

FIG.7

| SEED |
|---|
| PJL DOCUMENT PASSWORD SPECIFYING DATA (ENCRYPTED BY SEED) |
| PDF DATA (DATA ENCRYPTED BY DOCUMENT PASSWORD IS ENCRYPTED BY SEED) |
| PJL DATA (ENCRYPTED BY SEED) |

FIG.10

| CLIENT INFORMATION (IP ADDRESS) | PUBLIC KEY | SECRET KEY | VALIDATION PERIOD |
|---|---|---|---|

FIG.11

| CLIENT INFORMATION |
|---|
| PJL DOCUMENT PASSWORD SPECIFYING DATA (ENCRYPTED BY PUBLIC KEY) |
| PDF DATA (DATA ENCRYPTED BY DOCUMENT PASSWORD IS ENCRYPTED BY PUBLIC KEY) |
| PJL DATA (ENCRYPTED BY PUBLIC KEY) |

| FILE NAME | DRAWING DATA | JOB PASSWORD | USER ID | DATE |

FIG.16
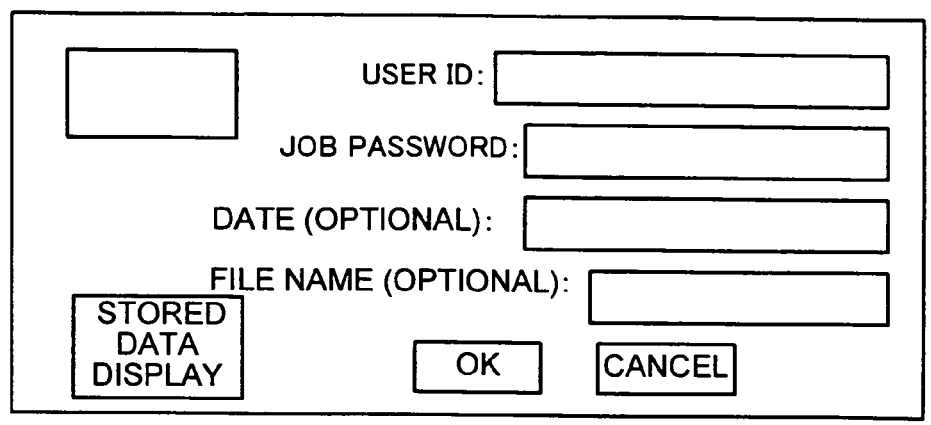
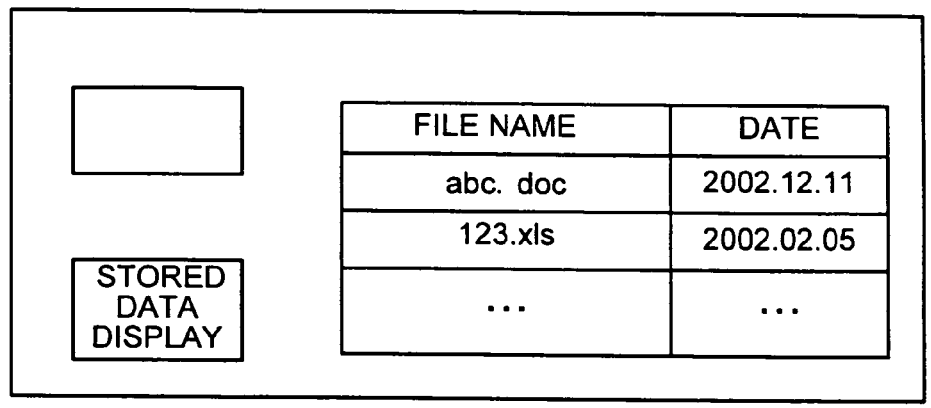
FIG.17
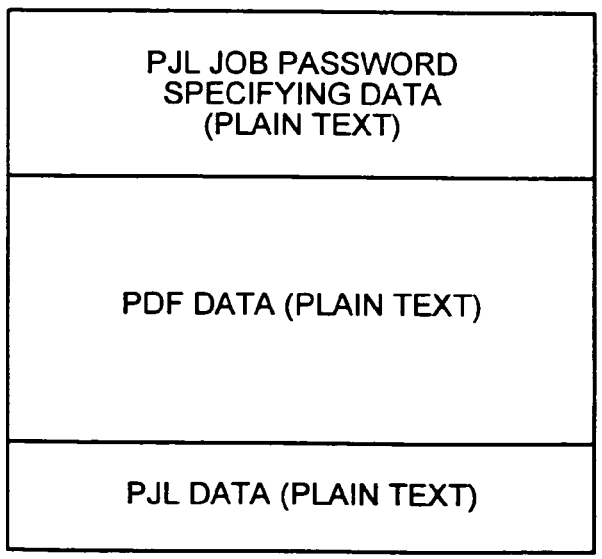

PRINTER DRIVER PROGRAM AND PRINTER

CROSS-REFERENCE TO RELATED APPLICATIONS

The present document incorporates by reference the entire contents of Japanese priority document, 2003-078788 filed in Japan on Mar. 20, 2003.

BACKGROUND OF THE INVENTION

1) Field of the Invention

The present invention relates to a technology to print an encrypted application document.

2) Description of the Related Art

An application such as Acrobat Reader® by Adobe® Systems Inc. has a function of encrypting document data by accepting document authentication information such as a document password to keep others from reading the document (see website of Adobe® Systems Inc., "with Adobe Acrobat, PDF can be used more effectively" (http://www.adobe.co.jp/acrofamily/features/acro_nikkei/page4.html)).

When printing such encrypted document data created by a personal computer (PC) on a printer connected to a network such as a local area network (LAN), an application decrypts the encrypted document based on a document password input, and sends the decrypted document to the printer driver. The printer driver then transmits the decrypted document to the printer on the network; and the printer prints the document directly.

To ensure that such encrypted document is not printed by others without permission, the printer driver prompts a user to input a job password for each print job upon receiving a request for decrypting and printing a document on the application. Then the printer driver transmits the document data and the job password to the printer. FIG. 17 is a schematic of a structure of print data used in the conventional printer driver and printer. A data for specifying a printer-job-language (PJL) job password is added to the head of a portable-document-format (PDF) document data (plain text).

The printer prompts the user to input an authentication password, and only when the authentication password input is valid, it starts printing the document.

However, in the conventional printer driver and printer, since a document encrypted by the application is decrypted at the time of printing, the document data is transmitted through the network in a plain text form from a PC to the printer. The plain text document data is subject to an interception by a malicious third party.

Even when the job password for each print job is employed to keep the malicious third party from printing out the encrypted document, the encrypted document can be intercepted by the third party on the network because the job password is in the plain text form. Furthermore, the decrypted document data is temporarily stored in a recording medium such as a hard disk drive (HDD) and a memory of the printer, and hence a user having a system administrator account can refer to the document data stored in the plain text form.

As described above, in the conventional printer driver and printer, the security problem occurs when a document data encrypted by an application is printed through the network.

SUMMARY OF THE INVENTION

It is an object of the present invention to solve at least the problems in the conventional technology.

The computer program according to one aspect of the present invention is for a printer driver that transmits a print data to a printer connected via a network to make a print request. The computer program makes a computer execute prompting a user to input document authentication information for decrypting an application document data encrypted by a predetermined application, creating a print data that includes the application document data and the document authentication information, and transmitting the print data to the printer.

The computer program according to another aspect of the present invention is for a printer driver that transmits a print data to a printer connected via a network to make a print request. The computer program makes a computer execute acquiring first key information predetermined between the printer and the printer driver from the printer, creating second key information using the first key information, prompting a user to input document authentication information for decrypting an application document data encrypted by a predetermined application, creating a print data that includes the application document data encrypted and the document authentication information input, encrypting the print data using the second key information, and transmitting the print data encrypted and the second key information to the printer.

The computer program according to still another aspect of the present invention is for a printer driver that transmits a print data to a printer connected via a network to make a print request. The computer program makes a computer execute acquiring public key information from the printer, prompting a user to input document authentication information for decrypting an application document data encrypted by a predetermined application, creating a print data that includes the application document data and the document authentication information, encrypting the print data using the public key information, and transmitting the print data encrypted and identification information unique to a client device to the printer.

The printer according to still another aspect of the present invention receives a print data from a client device connected via a network to perform a printing process. The printer includes a document decrypting unit that decrypts an application document data encrypted by document authentication information included in the print data, and a printing unit that prints the application document data decrypted.

The printer according to still another aspect of the present invention receives a print data from a client device connected via a network to perform a printing process. The printer includes a first key information creating unit that creates a first key information predetermined between the client device and the printer, and transmits the first key information created to the client device, a decrypting unit that extracts the first key information from a second key information received from the client device, and decrypts the print data using the first key information, a document decrypting unit that decrypts, using document authentication information included in the print data, an application document data encrypted, and a printing unit that prints the application document data decrypted.

The printer according to still another aspect of the present invention receives a print data from a client device connected via a network to perform a printing process. The printer includes a public key processing unit that creates a public key information from a secret key information corresponding to identification information unique to the client device, and transmits the public key information to the client device, a decrypting unit that decrypts the print data using the secret key information corresponding to the identification information received from the client device, a document decrypting unit that decrypts, using document authentication information included in the print data, an application document data encrypted, and a printing unit that prints the application document data decrypted.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 7 is a schematic of a structure of a print data created by the printer driver according to the second embodiment;

FIG. 10 is a schematic of a data structure of a key table according to the third embodiment;

FIG. 11 is a schematic of a structure of a print data created by the printer driver according to the third embodiment;

FIG. 16 is a schematic diagram for illustrating an example of a flow of a job selection screen in the printer according to the fourth embodiment; and FIG. 17 is schematic of a structure of a print data used between the conventional printer driver and printer.

DETAILED DESCRIPTION

Exemplary embodiments of a printer driver program and a printer according to the present invention are explained in detail with reference to the accompanying drawings.

Figure 1:
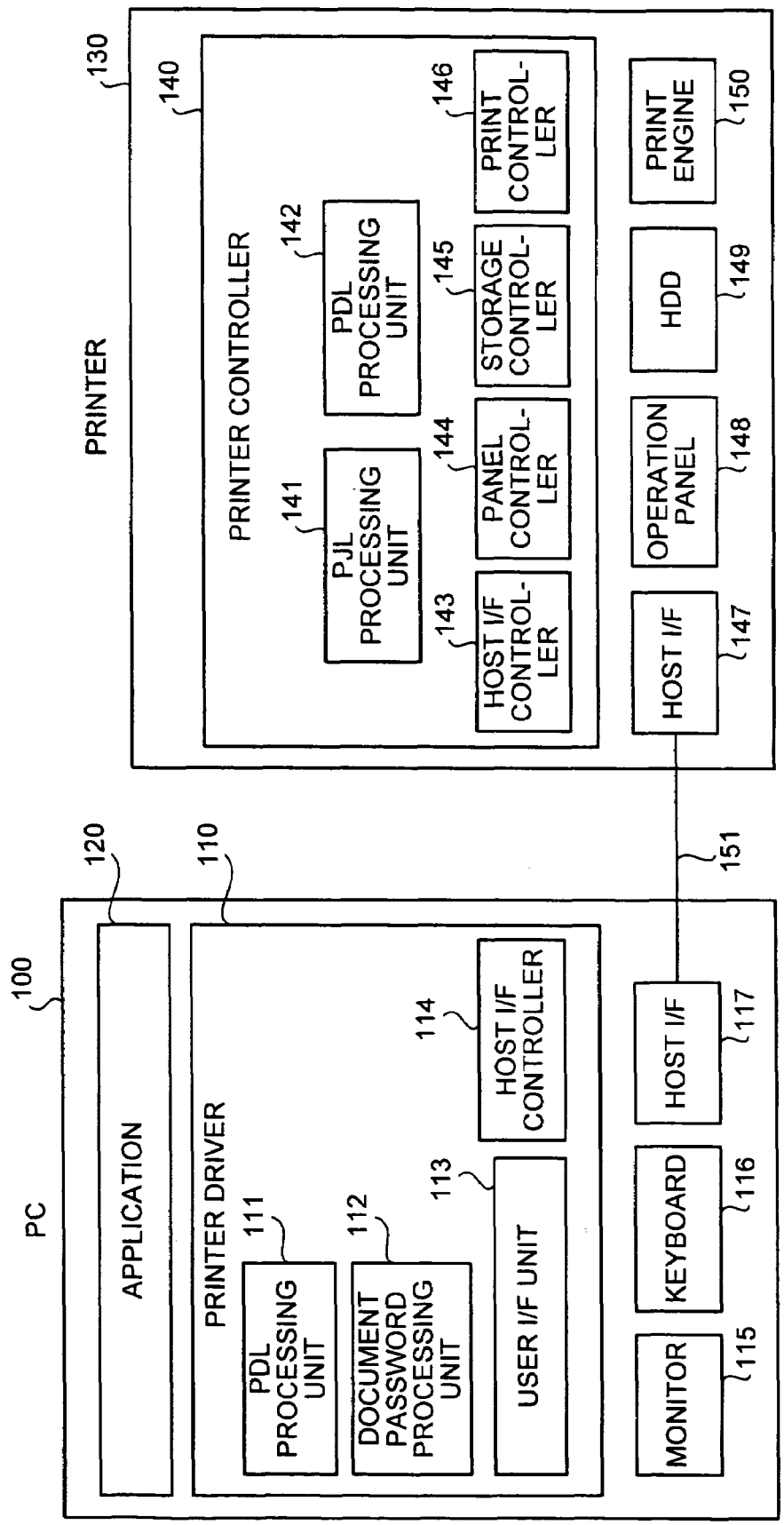
FIG. 1 is a schematic diagram for illustrating a functional configuration of a client device (PC) and a printer according to a first embodiment of the present invention.

FIG. 1 is a schematic diagram for illustrating a functional configuration of a client device (PC) 100 and a printer 130 according to a first embodiment of the present invention. In the PC 100 according to the first embodiment, PDF document data is created and encrypted by Acrobat®, being an application 120 on the PC, and the encrypted PDF document data, which can be decrypted by inputting a document password, is transmitted to the printer 130 directly (without decrypting), and is printed by the printer 130.

The printer 130 and the PC 100 are connected by a network, such as a LAN 151. A printer drive 110 is installed in the PC 100 and basically includes a page description language (PDL) processing unit 111, a document password processing unit 112, a user interface section 113, and a host interface (I/F) controller 114.

The document password processing unit 112 requests an input instruction for a document password required for decrypting the PDF document data encrypted in the application 120, and receives the input document password. The document password input from a user is added to the head of the encrypted PDF document data as PJL document password specifying data. PJL data, being data relating to the print job, is then added to the tail of the encrypted PDF document data added with the PJL document password specifying data. The encrypted PDF document data added with these PJL document password specifying data and PJL data is designated as print data. This document password constitutes document authentication information according to the present invention.

The PDL processing unit 111 is used when the PDF document data (non-encrypted data) is printed, and converts the print document data for the non-encrypted PDF document data to PDL data to create the print data.

The user interface section 113 displays various screens on a monitor 115 and accepts an input event from a keyboard 116 by the user.

The host I/F controller 114 transmits the encrypted PDF document data from a host I/F 117 through the LAN 151 to the printer 130.

A print controller 140 is installed in the printer 130, and the print controller 140 basically includes a PDL processing unit 142, a PJL processing unit 141, a host I/F controller 143, a panel controller 144, a storage controller 145, and a print controller 146.

The PJL processing unit 141 interprets the PJL document password specifying data described in the PJL added to the head of the print data received from the PC 100, to obtain the document password. Furthermore, the PJL processing unit 141 performs various types of control relating to the print job.

The PDL processing unit 142 determines the validity of the document password obtained by the PJL processing unit 141. When the document password is valid, the PDL processing unit 142 decrypts the encrypted PDF document data using the document password, and creates drawing data. The PDL processing unit 142 constitutes a document decrypting unit according to the present invention.

The host I/F controller 143 receives the print data from the PC 100 via the LAN 151 and the host I/F 147.

The panel controller 144 controls display output with respect to the operation panel 148 and acquisition of the input event. The storage controller 145 controls read and write with respect to an HDD 149 and a memory. The print controller 146 controls a print request with respect to a print engine 150.

Figure 2:
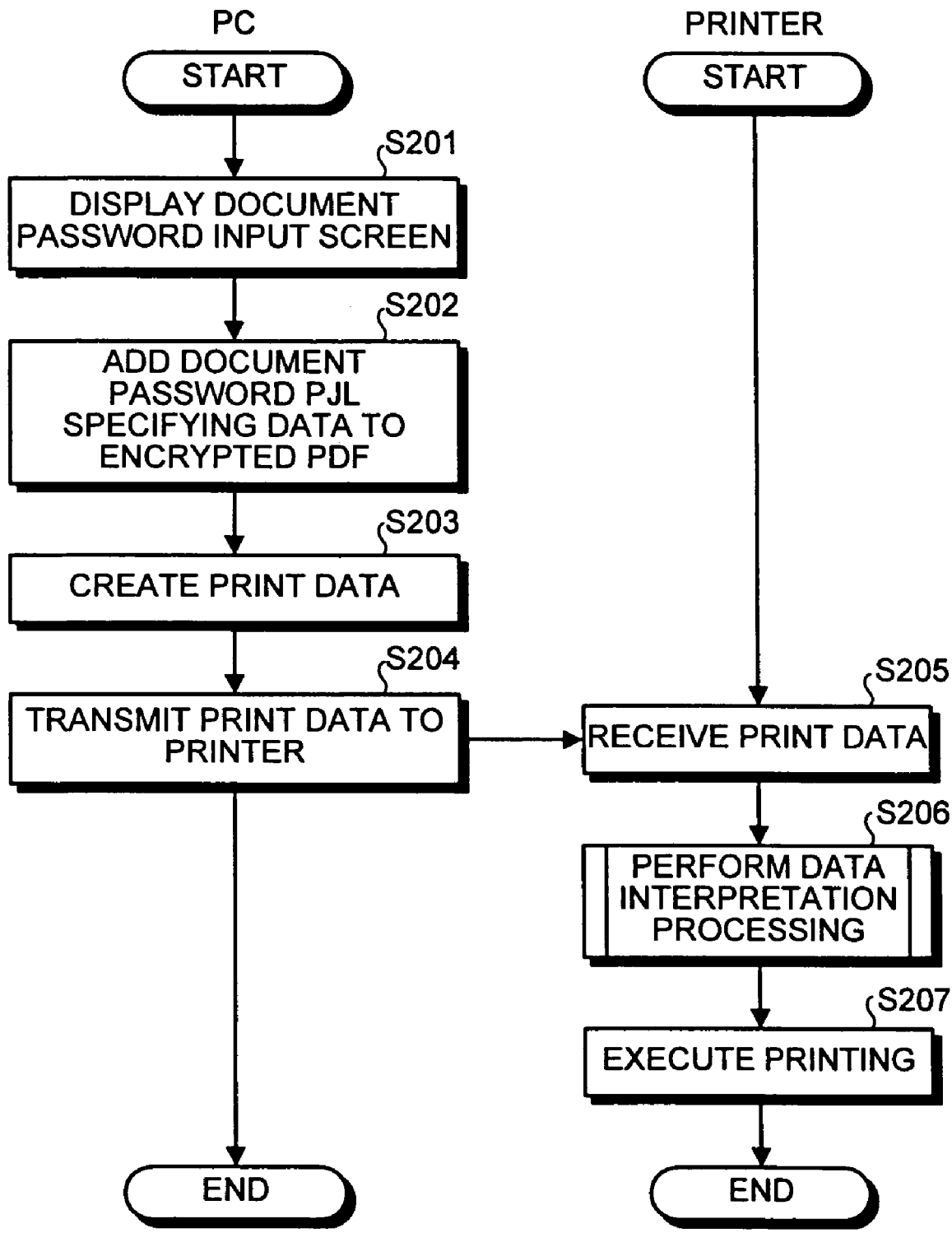
FIG. 2 is a flowchart of a procedure for printing an encrypted PDF document data by the printer driver and the printer according to the first embodiment.

The print processing of the encrypted PDF document data by the printer driver and the printer 130 according to the embodiment constituted as described above will be explained below. FIG. 2 is a flowchart of a procedure for printing an encrypted PDF document data by the printer driver and the printer according to the first embodiment.

Mentioned below is an instance when the user encrypts the PDF document data by a document password using the application 120 (Acrobat® or the Acrobat reader®) and specifies an IP address of the printer 130 on the print screen in the application 120, with the document being still in the encrypted state, to issue a print command.

At this time, in the printer driver 110, the document password processing unit 112 issues a display request of a document password input screen to the user interface section 113, and the user interface section 113 displays a document password input screen on the monitor 115 (step S201).

When the user inputs the document password for the encrypted PDF document data from the keyboard 116 on the document password input screen, the user interface section 113 obtains the key event. The document password processing unit 112 adds the obtained document password to the head of the encrypted PDF document data as the PJL document password specifying data (step S202). The document password processing unit 112 adds the PJL data to the tail of the encrypted PDF document data added with the PJL document password specifying data, and the data is created as the print data (step S203). The created print data is transmitted to the printer 130 by the host I/F controller 114 (step S204).

Figure 4:
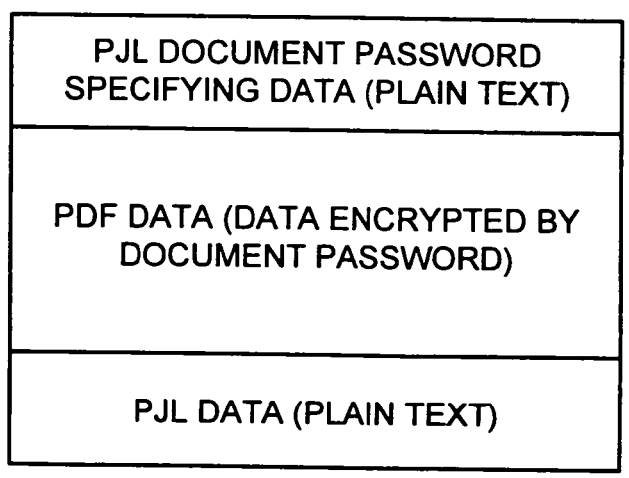
FIG. 4 is a schematic of a structure of a print data created by the printer driver according to the first embodiment.

FIG. 4 is a schematic of a structure of a print data created by the printer driver 110 according to the first embodiment. The print data includes the PJL document password specifying data (plain text), the encrypted PDF document data, and the PJL data. The PJL data may not be added.

The printer 130 receives the print data by the host I/F controller 143 (step S205), and performs data interpretation processing of the received print data (step S206), and executes printing by the print controller 146 (step S207).

Figure 3:
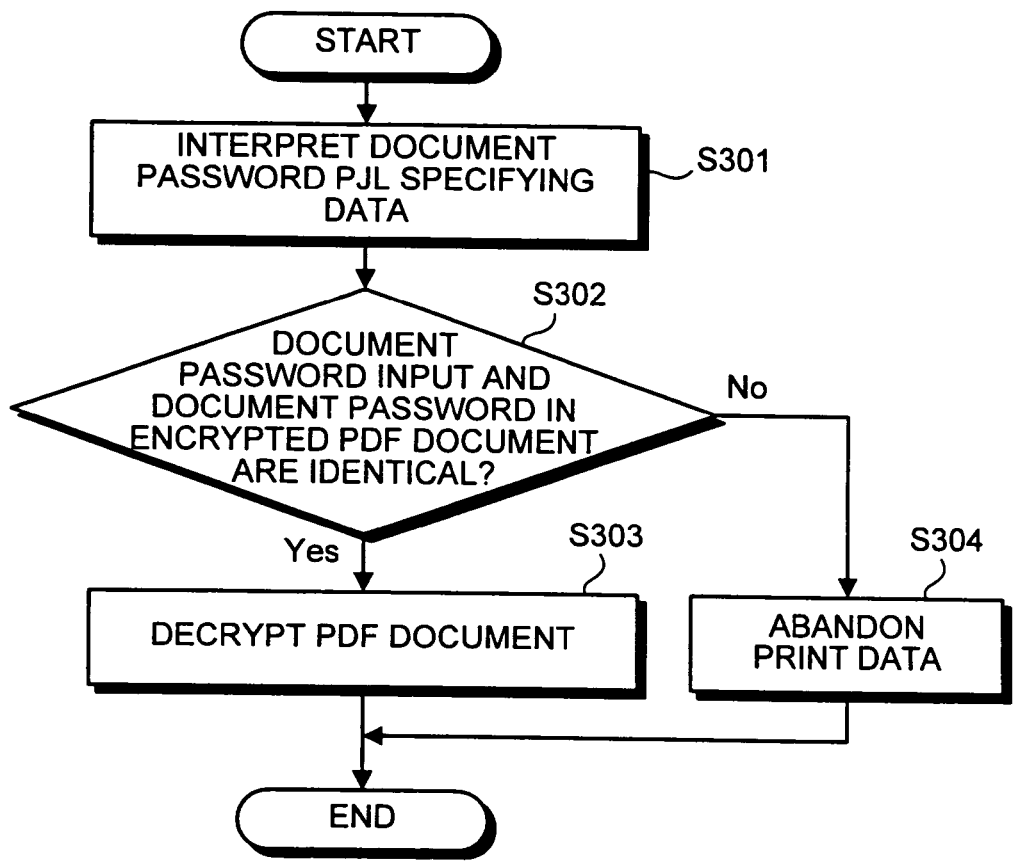
FIG. 3 is a flowchart of a procedure for interpreting print data according to the first embodiment.

Interpretation processing of the print data will be explained here. FIG. 3 is a flowchart of a procedure for interpreting print data according to the first embodiment. The PJL processing unit 141 interprets the PJL document password specifying data included in the print data and obtains the document password (step S301). The PDL processing unit 142 checks whether the obtained document password and the document password included in the encrypted PDF document data match each other, to determine the validity of the document password included in the print data (step S302). Acquisition of the document password included in the encrypted PDF document data is performed by invoking a password acquisition function provided in the application 120.

When the both document passwords match each other, it is determined that the document password is valid, and the PDL processing unit 142 decrypts the encrypted PDF document data to create the drawing data (step S303). On the other hand, when the both document passwords do not match each other, it is determined that the document password is not valid, and the PDL processing unit 142 annuls the print data and does not execute the print processing (step S304).

In the printer driver 110 and the printer 130 according to the first embodiment, the print data including the document password for decrypting the application document data encrypted by the application 120 and the encrypted PDF document data is transmitted to the printer 130 connected to the network. Therefore, the encrypted PDF document data can be transmitted to the printer 130 without being decrypted, so that the printer 130 can decrypt the data by the document password transmitted simultaneously and perform printing. Therefore, it can be prevented that the content of the application document data is intercepted by a malicious third person on the network.

Furthermore, since the PDF document data can be stored in the encrypted state in the HDD 149 and the like, until being decrypted by the printer 130, it can be prevented that the content of the PDF document data is read or falsified by a malicious system administrator, thereby enabling improvement in security in printing the encrypted document.

Figure 5:
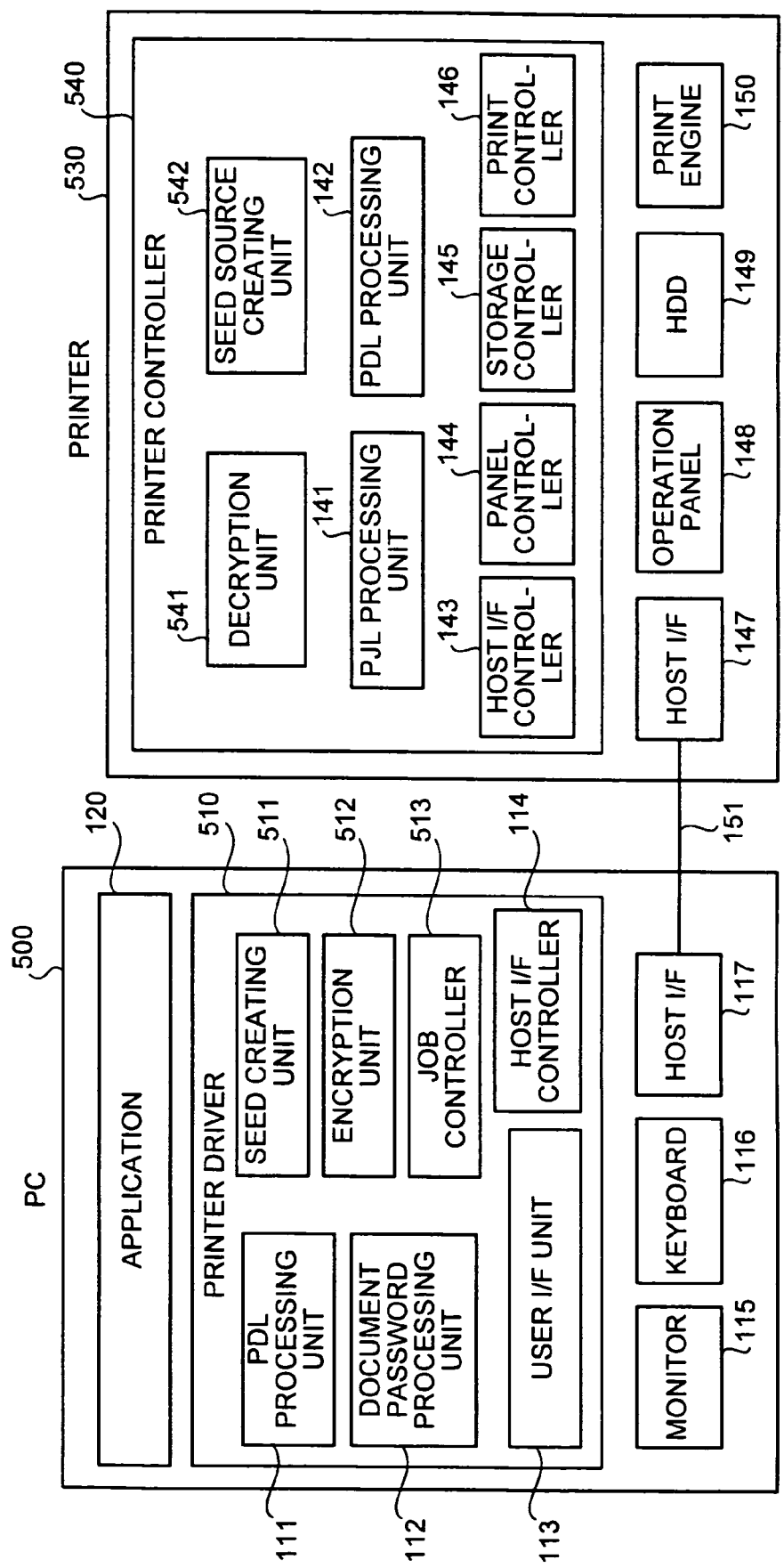
FIG. 5 is a schematic diagram for illustrating a functional configuration of a PC and a printer according to a second embodiment of the present invention.

FIG. 5 is a schematic diagram for illustrating a functional configuration of a PC 500 and a printer 530 according to a second embodiment of the present invention. In the PC 500, the PDF document data is created and encrypted by the Acrobat®, being the application 120 on the PC. The document password and the encrypted PDF document data that can be decrypted by inputting the document password are encrypted by a SEED determined between the PC 500 and the printer 530, and transmitted to the printer 130, and the printer 530 decrypts the document data by the SEED source and print the document data.

The printer 530 and the PC 500 are connected by a network, such as the LAN 151. A printer driver 510 is installed in the PC 500, and basically includes the PDL processing unit 111, the document password processing unit 112, a SEED creating section 511, an encryption unit 512, a job controller 513, the user interface section 113, and the host I/F controller 114.

The document password processing unit 112 requests an input instruction for the document password necessary for decrypting the PDF document data encrypted in the application 120, and receives the input document password. The document password input by the user is added to the head of the encrypted PDF document data as the PJL document password specifying data. The other functions are the same as in the document password processing unit according to the first embodiment.

The job controller 513 requests the SEED source to the printer 530, and the SEED creating section 511 creates the SEED from the SEED source received from the printer 530.

The encryption unit 512 encrypts the PJL document password specifying data, the encrypted PDF document data, and the PJL data, being the data relating to the print job, by using the created SEED. The PDL processing unit 111 has the same function as according to the first embodiment.

The user interface section 113 has the same function as that of the printer driver 110 in the first embodiment. The host I/F controller 114 transmits the print data and the SEED from the host I/F 117 to the printer 130 via the LAN 151.

The printer 530 is equipped with a printer controller 540. The printer controller 540 basically includes a decrypting unit 541, a SEED source creating section 542, the PDL processing unit 142, the PJL processing unit 141, the host I/F controller 143, the panel controller 144, the storage controller 145, and the print controller 146.

The SEED source creating section 542 creates and transmits the SEED source to the PC 500 having requested it.

The decrypting unit 541 determines the validity of the SEED transmitted from the PC 500, and when the SEED is valid, the print data transmitted from the PC 500 is decrypted by the SEED.

The PJL processing unit 141 interprets the PJL document password specifying data described in the PJL and added to the print data received from the PC 500, to obtain the document password. The PJL processing unit 141 performs various types of control relating to the print job.

The PDL processing unit 142 determines the validity of the document password obtained by the PJL processing unit 141. When the password is valid, the PDL processing unit 142 decrypts the PDL document data by using the document password and creates the drawing data. The PDL processing unit 142 constitutes the document decrypting unit in the present invention.

The host I/F controller 143, the panel controller 144, the storage controller 145, and the print controller 146 have the same functions as those of the printer controller 140 in the first embodiment.

Figure 6:
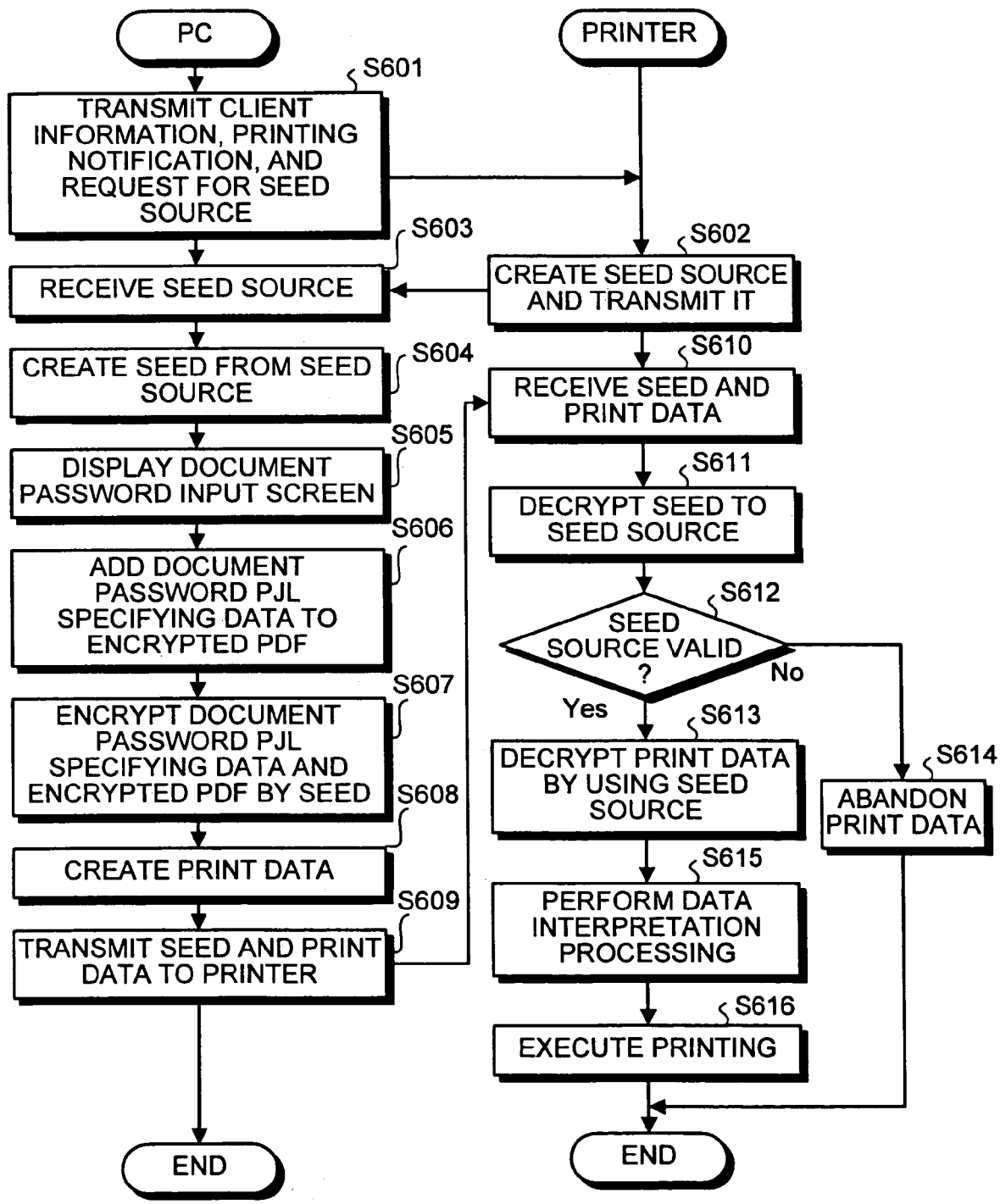
FIG. 6 is a flowchart illustrating a procedure for printing an encrypted PDF document data by the printer driver and the printer according to the second embodiment.

The print processing of the encrypted PDF document data by the printer driver 510 and the printer 530 in this embodiment constructed as described above will be explained below. FIG. 6 is a flowchart illustrating a procedure for printing an encrypted PDF document data by the printer driver 510 and the printer 530 according to the second embodiment.

Mentioned below is an instance when the user encrypts the PDF document by a document password using the application 120 (Acrobat® or Acrobat reader®) and specifies an IP address of the printer 130 on a print screen in the application 120, with the document being still in the encrypted state, to issue a print command.

At this time, the job controller 513 transmits the IP address, being the client information of the PC 500, a printing notification, and a SEED source request to the printer 530 (step S601).

In the printer 530 having received the IP address, the printing notification, and the SEED source request, the SEED source creating section 542 creates a SEED unique to the IP address and transmits it to the PC 500 that has requested the SEED (step S602). As the timing for creating and transmitting the SEED, the SEED can be transmitted when the printer 530 becomes ready for printing upon reception of the request, as well as transmitting it immediately upon reception of the request.

In the PC 500, when the host I/F controller 114 receives the SEED source (step S603), the SEED creating section 511 creates the SEED from the received SEED source (step S604).

When the document password processing unit 112 issues a display request of the document password input screen to the user interface section 113, the user interface section 113 displays the document password input screen on the monitor 115 (step S605).

When the user inputs the document password for the encrypted PDF document data from the keyboard 116 on the document password input screen, the user interface section 113 obtains the key event. The document password processing unit 112 adds the obtained document password to the head of the encrypted PDF document data as the PJL document password specifying data (step S606). The document password processing unit 112 adds the PJL data to the tail of the encrypted PDF document data added with the PJL document password specifying data, and the encryption unit 512 encrypts the three data by the SEED (step S607).

The print data is created from data obtained by encrypting the three data, that is, the PJL document password specifying data, the encrypted PDF document data, and the PJL data (step S608). The created print data is transmitted together with the SEED to the printer 130 by the host I/F controller 114 (step S609).

FIG. 7 is a schematic of a structure of a print data created by the printer driver 510 according to the second embodiment. The print data is added with the SEED at the head and includes the PJL document password specifying data (encrypted), the encrypted PDF document data (encrypted), and the PJL data (encrypted). The PJL data may not be added.

In the printer 130, the host I/F controller 143 receives the print data (step S610), and the decrypting unit 541 decrypts the received SEED to the SEED source (step S611). The validity of the SEED source is determined by checking whether the SEED source decoded by the decrypting unit 541 and the SEED source created by the SEED source creating section 542 at step S602 match each other (step S612). When the both SEED sources match each other, it is determined that the received SEED is valid, and the decrypting unit 542 decrypts the print data by using the SEED source (step S613).

On the other hand, when the both SEED sources do not match each other, it is determined that the received SEED is invalid, that is, the SEED has been falsified, and the decrypting unit 542 annuls the print data and does not execute decryption processing (step S614).

Data interpretation processing for the decrypted print data is then performed (step S 615), and the print controller 146 executes printing (step S616). The data interpretation processing is performed in the same manner as in the printer controller 140 according to the first embodiment.

According to the embodiment, at the time of printing the encrypted PDF document data, the SEED source request is issued from the printer driver 510 to the printer 530 to obtain the SEED source. Alternatively, when the host I/F controller 143 in the printer 530 receives a broadcast message indicating that the PC 500 is connected to the network from the PC 500 and detects the connection, the SEED source may be created and transmitted to the connected PC 500. In this case, when the PC 500 is connected to the network, the host I/F controller 114 in the printer driver 510 transmits the broadcast message, being a connection notification, to the printer 530.

In the printer driver 510 and the printer 530 according to the second embodiment, the SEED is created from the SEED source obtained from the printer 530, the print data including the document password for decrypting the PDF document data encrypted by the application 120 and the encrypted PDF document data is encrypted by the SEED, and the encrypted print data and the SEED are transmitted to the printer 530 connected to the network. The encrypted print data is then decrypted and printed by the printer 530. In other words, since the encrypted application document data is transmitted to the printer, without being decrypted, and with the document password for decrypting being encrypted by the SEED, it can be reliably prevented that the content of the PDF document data is intercepted by a malicious third person on the network.

Furthermore, since the PDF document data and the document password can be stored in a recording medium or the like in the encrypted state, until the document data is decrypted by the printer 530, it can be prevented that the content of the application document data is read or falsified by a malicious system administrator, thereby enabling improvement in security in printing the encrypted document.

According to the embodiment, the both document password and encrypted PDF document data are encrypted by the SEED to create the print data. However, the print data may be created by encrypting only the document password by the SEED, without encrypting the encrypted PDF document data. It is because the PDF document data has already been encrypted by the document password.

Figure 8:
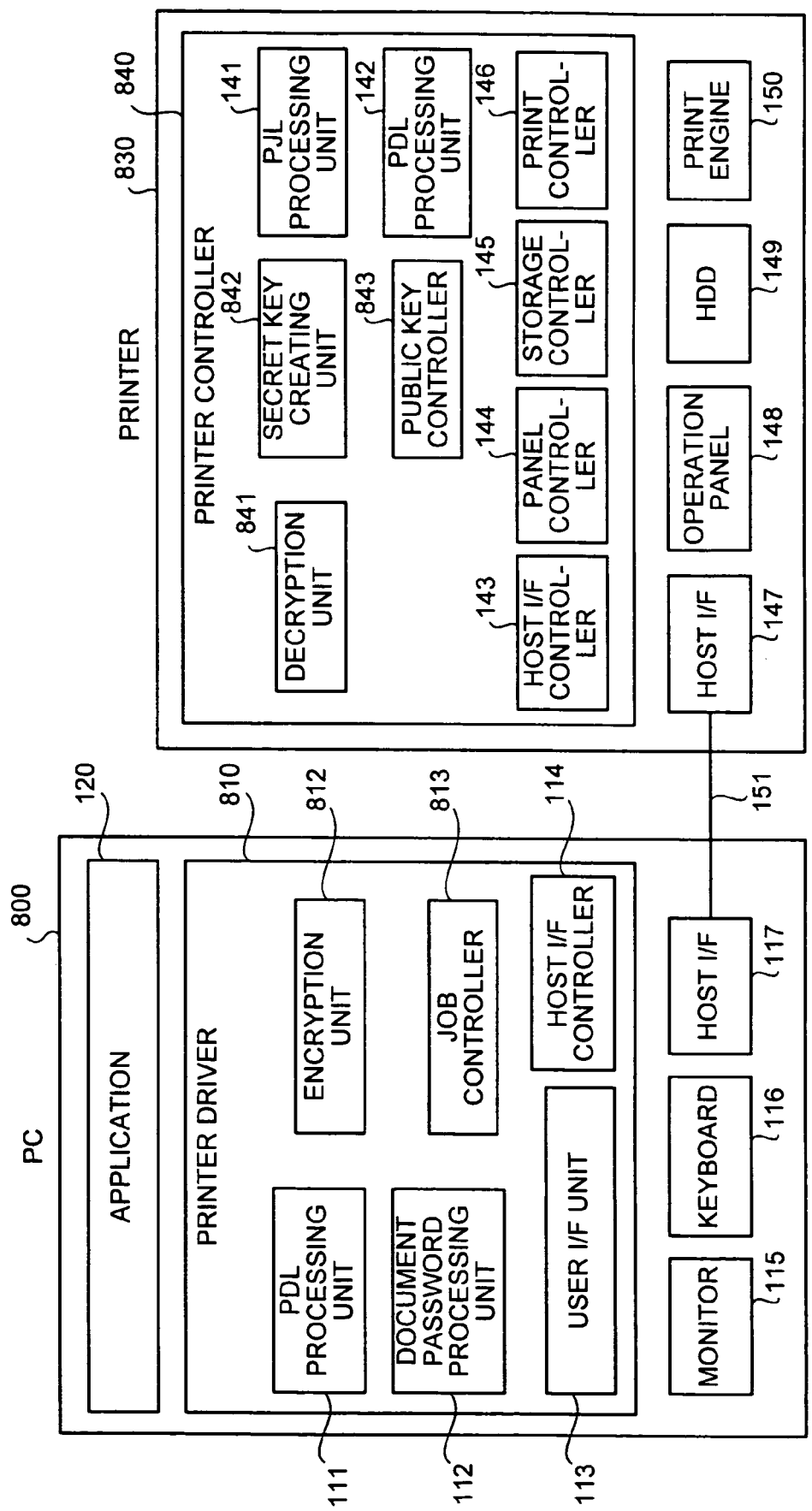
FIG. 8 is a schematic diagram for illustrating a functional configuration of a PC and a printer according to a third embodiment of the present invention.

FIG. 8 is a schematic diagram for illustrating a functional configuration of a PC 800 and a printer 830 according to a third embodiment of the present invention. In the PC 800 according to the embodiment, the PDF document data is created and encrypted by the Acrobat®, being the application 120 on the PC. The document password and the encrypted PDF document data, which can be decrypted by inputting the document password, are encrypted by a public key and transmitted to the printer 830. The printer 830 decrypts the document password and the encrypted PDF document data by a secret key and print the PDF document data.

The printer 830 and the PC 800 are connected by a network, such as the LAN 151. A printer driver 810 is installed in the PC 800 and the printer driver 810 basically includes the PDL processing unit 111, the document password processing unit 112, an encryption unit 812, a job controller 813, the user interface section 113, and the host I/F controller 114.

The document password processing unit 112 requests an input instruction for the document password necessary for decrypting the PDF document data encrypted in the application 120, and receives the input document password. The document password input by the user is added to the head of the encrypted PDF document data as the PJL document password specifying data. The other functions are the same as according to the first embodiment.

The job controller 813 requests the public key to the printer 830. The encryption unit 812 encrypts the PJL document password specifying data, the encrypted PDF document data, and the PJL data, being the data relating to the print job, by the public key received from the printer 830. The PDL processing unit 111 has the same function as that of the PDL processing unit 111 according to the first embodiment.

The user interface section 113 has the same function as that of the printer driver 110 in the first embodiment. The host I/F controller 114 transmits the print data and the client information (IP address) from the host I/F 117 to the printer 130 via the LAN 151.

The printer 830 is equipped with a printer controller 840. The printer controller 840 basically includes a decrypting unit 841, a secret key creating section 842, a public key processing unit 843, the PDL processing unit 142, the PJL processing unit 141, the host I/F controller 143, the panel controller 144, the storage controller 145, and the print controller 146.

The secret key creating section 842 creates a secret key for the PC 800 having issued the request. The public key processing unit 843 creates a public key from the secret key, registers the created public key in a key table, and transmits the created public key to the PC 800, which has issued the request.

The decrypting unit 841 determines the validity of the public key transmitted from the PC 800, and when the public key is valid, the print data transmitted from the PC 800 is decrypted by the secret key corresponding to the public key.

The PJL processing unit 141 interprets the PJL document password specifying data described in the PJL added to the print data received from the PC 500, to obtain the document password. The PJL processing unit 141 performs various types of control relating to the print job.

The PDL processing unit 142 determines the validity of the document password obtained by the PJL processing unit 141. When the document password is valid, the PDL document data is decrypted by using the document password, to create the drawing data.

The host I/F controller 143, the panel controller 144, the storage controller 145, and the print controller 146 have the same function as that of the printer controller 140 according to the first embodiment.

Figure 9:
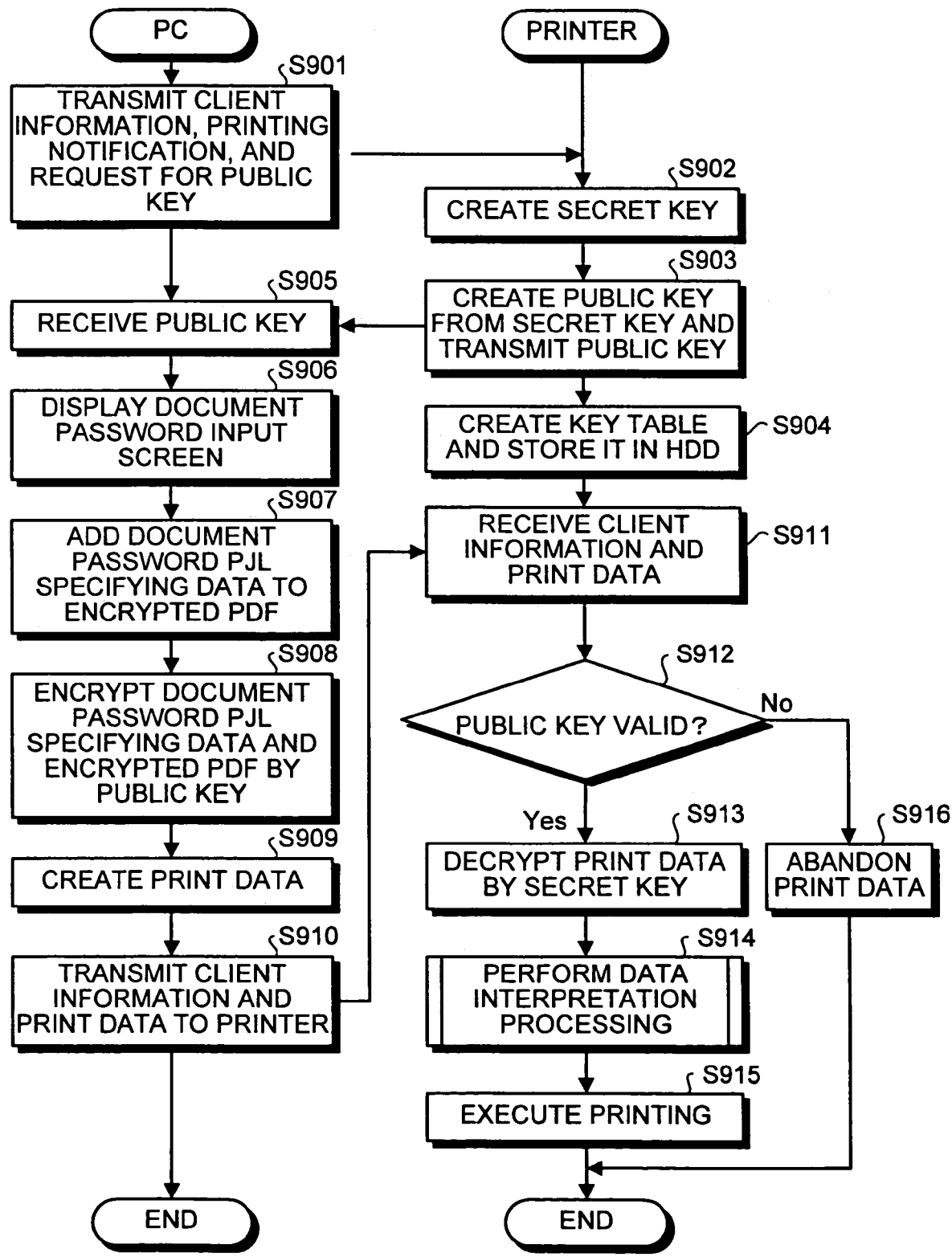
FIG. 9 is a flowchart illustrating a procedure for printing an encrypted PDF document data by the printer driver and the printer according to the third embodiment.

The print processing of the encrypted PDF document data by the printer driver 810 and the printer 830 according to the embodiment constructed as described above will be explained below. FIG. 9 is a flowchart illustrating a procedure for printing an encrypted PDF document data by the printer driver 810 and the printer 830 according to the third embodiment.

Mentioned below is an instance when the user encrypts the PDF document data by a document password using the application 120 (Acrobat® or the Acrobat reader®), and specifies an IP address of the printer 130 on the print screen in the application 120, with the document being still in the encrypted state, to issue a print command.

At this time, the job controller 813 transmits the IP address, being the client information of the PC 800, the printing notification, and a public key request to the printer 830 (step S901).

The printer 830 having received the IP address, the printing notification, and the public key request creates a secret key unique to the IP address by the secret key creating section 842 (step S902). The public key processing unit 843 creates a public key from the secret key and transmits the public key to the PC 800 having issued the request (step S903). As the timing for creating and transmitting the public key, the public key can be transmitted when the printer 830 becomes ready for printing upon reception of a request, as well as transmitting it immediately upon reception of the request. When the public key is created, the public key processing unit 843 creates the key table in the HDD 149, and registers the created public key and the secret key therein (step S904).

FIG. 10 is a schematic of a data structure of a key table according to the third embodiment. The key table is formed of the IP address, being the client information, the public key, the secret key, and the expiration date of the key.

In the PC 800, when the host I/F controller 114 receives the public key (step S905), the document password processing unit 112 issues a display request of the document password input screen to the user interface section 113, and the user interface section 113 displays the document password input screen on the monitor 115 (step S906).

When the user inputs the document password for the encrypted PDF document data from the keyboard 116 on the document password input screen, the user interface section 113 obtains the key event. The document password processing unit 112 adds the obtained document password to the head of the encrypted PDF document data as the PJL document password specifying data (step S907). The document password processing unit 112 adds the PJL data to the tail of the encrypted PDF document data added with the PJL document password specifying data, and the encryption unit 812 encrypts the three data by the public key (step S908).

The print data is created from data obtained by encrypting the three data, that is, the PJL document password specifying data, the encrypted PDF document data, and the PJL data (step S909). The created print data is transmitted together with the IP address, being the client information of the PC 800, to the printer 830 by the host I/F controller 114 (step S910).

FIG. 11 is a schematic of a structure of a print data created by the printer driver 810 according to the third embodiment. The print data is added with the client information (IP address) at the head and is formed of the PJL document password specifying data (encrypted), the encrypted PDF document data (encrypted), and the PJL data (encrypted). The PJL data may not be added.

In the printer 830, the host I/F controller 143 receives the print data (step S911), and the decrypting unit 841 refers to the key table and determines whether the public key corresponding to the client information at the received IP address is valid (step S912). When the public key is valid, the decrypting unit 542 decrypts the print data by the secret key (step S913). On the other hand, when the public key is not valid, the decrypting unit 542 annuls the received print data and does not perform the decryption processing (step S916).

The data interpretation processing for the decrypted print data is performed (step S914), and printing is executed by the print controller 146 (step S915). The data interpretation processing is performed in the same processing as in the printer controller 140 according to the first embodiment.

According to the embodiment, at the time of printing the encrypted PDF document data, the public key is obtained by issuing a public key request from the printer driver 810 to the printer 830. Alternatively, when the host I/F controller 143 in the printer 830 receives a broadcast message indicating that PC 800 is connected to the network from the PC 800 and detects the connection, the secret key and the public key may be created and transmitted to the connected PC 800. In this case, when the PC 800 is connected to the network, the host I/F controller 114 in the printer driver 810 transmits the broadcast message, being a connection notification, to the printer 830.

In the printer driver 810 and the printer 830 according to the third embodiment, since the encrypted PDF document data is not decrypted and the document password for decrypting is encrypted by the public key and transmitted to the printer 830, it can be reliably prevented that the content of the application document data is intercepted by a malicious third person on the network.

Furthermore, since the application document data and the document authentication information can be stored in a recording medium or the like in the encrypted state, until the document data is decrypted by the printer 830 by using the secret key, it can be prevented that the content of the application document data is read or falsified by a malicious system administrator, thereby enabling improvement in security in printing the encrypted document.

According to the embodiment, the both document password and encrypted PDF document data are encrypted by the public key to create the print data. However, the print data may be created by encrypting only the document password by the public key, without encrypting the encrypted PDF document data. It is because the PDF document data has already been encrypted by the document password.

Figure 12:
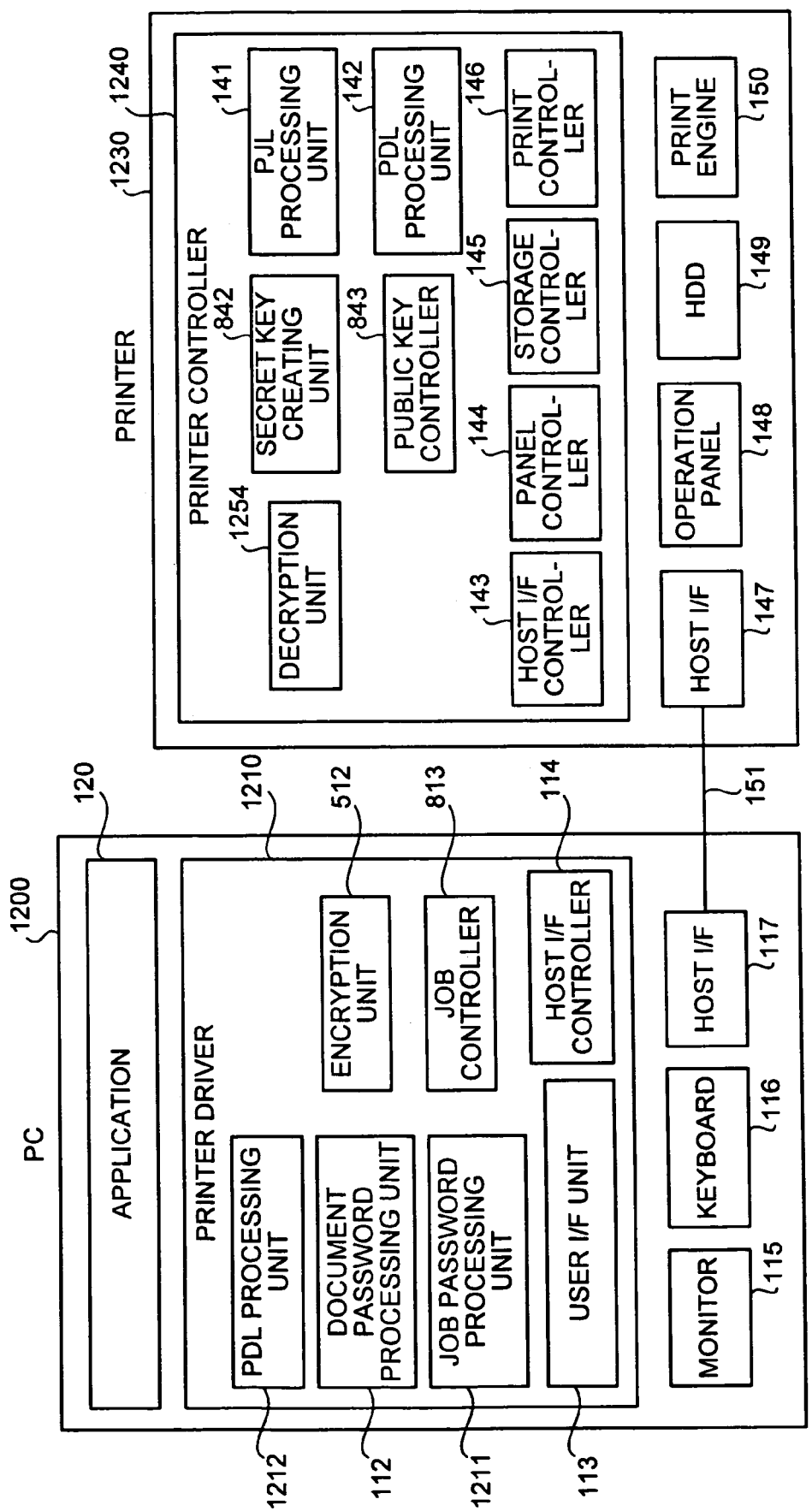
FIG. 12 is a schematic diagram for illustrating a functional configuration of a PC and a printer according to a fourth embodiment of the present invention.

FIG. 12 is a schematic diagram for illustrating a functional configuration of a PC 1200 and a printer 1230 according to a fourth embodiment of the present invention. In the PC 1200 according to the embodiment, the PDF document data is created and encrypted by the Acrobat®, being the application 120 on the PC. The document password and the encrypted PDF document data, which can be decrypted by inputting the document password, are encrypted by the public key and transmitted to the printer 1230, and a job password for the print job is also transmitted to the printer 1230. The printer 1230 decrypts the document password and the encrypted PDF document data with the secret key and print the PDF document data.

The printer 1230 and the PC 1200 are connected by a network, such as the LAN 151. A printer driver 1210 is installed in the PC 1200 and the printer driver 1210 basically includes a PDL processing unit 1212, the document password processing unit 112, a job password processing unit 1211, the encryption unit 812, the job controller 813, the user interface section 113, and the host I/F controller 114.

The job password processing unit 1211 issues an input request of a job password for the print job and receives the input job password. The job password processing unit 1211 adds the job password input from the user to the encrypted PDF document data as the PJL job password specifying data. The job password constitutes the job authentication information according to the present invention. The PDL processing unit 1212 has the same function as that of the PDL processing unit 111 according to the first embodiment.

The document password processing unit 112, the user interface section 113, and the host I/F controller 114 have the same function as that of the printer driver according to the third embodiment.

A printer controller 1240 is installed in the printer 1230. The printer controller 1240 basically includes a decrypting unit 1254, the secret key creating section 842, the public key processing unit 843, the PDL processing unit 142, the PJL processing unit 141, the host I/F controller 143, the panel controller 144, the storage controller 145, and the print controller 146.

The PJL processing unit 141 interprets the PJL document password specifying data described in the PJL added to the print data received from the PC 500, to obtain the document password, and interprets the PJL job password specifying data to obtain the job password. The PJL processing unit 141 performs various types of control relating to the print job.

The decrypting unit 841, the secret key creating section 842, the public key processing unit 843, the PDL processing unit 142, the host I/F controller 143, the panel controller 144, and the storage controller 145 have the same function as that of the printer according to the first embodiment.

Figure 13:
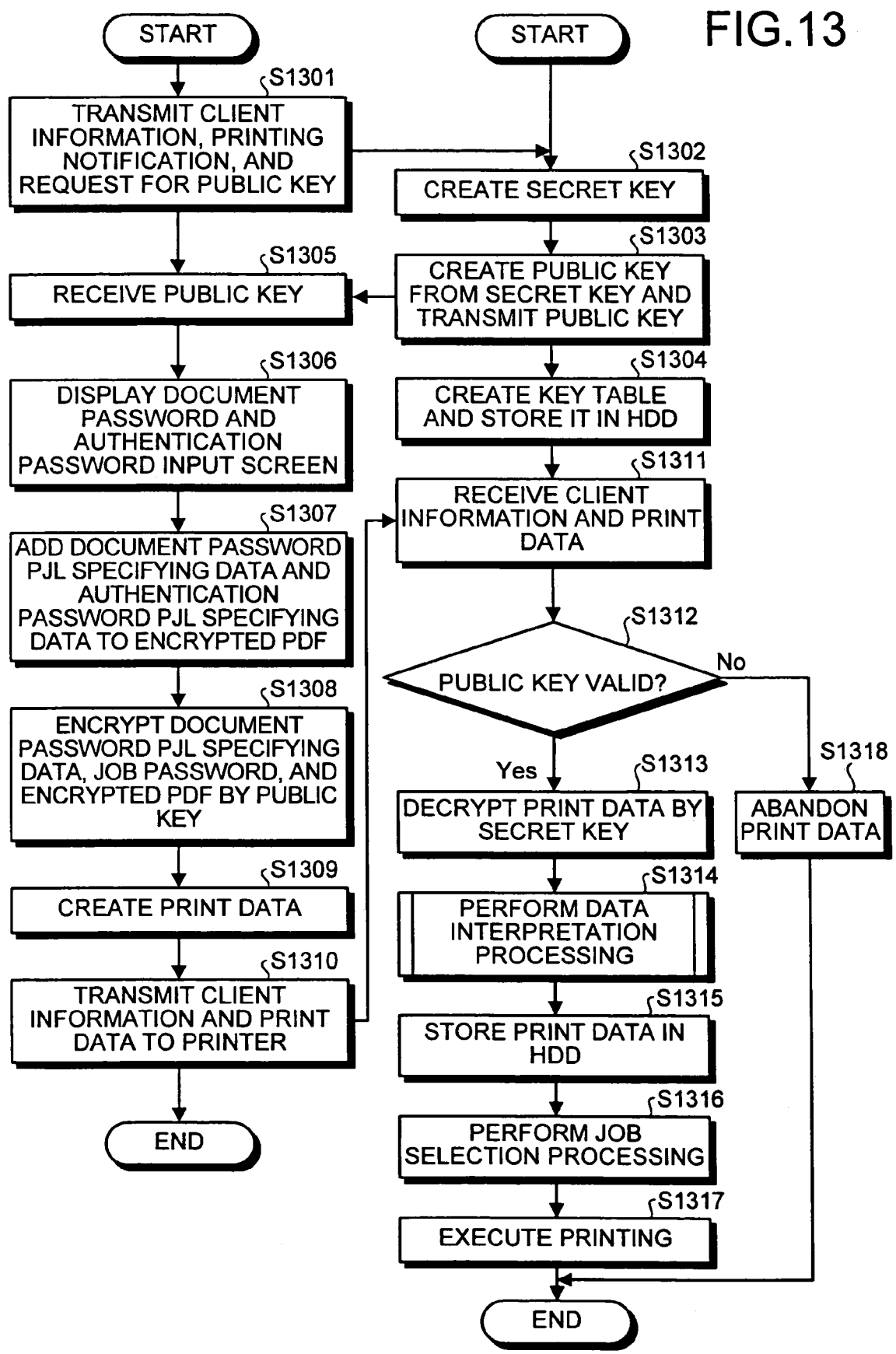
FIG. 13 is a flowchart illustrating a procedure for printing an encrypted PDF document data by the printer driver and the printer according to the fourth embodiment.

The print processing of the encrypted PDF document data by the printer driver 1210 and the printer 1230 according to the embodiment constituted as described above will be explained below. FIG. 13 is a flowchart illustrating a procedure for printing an encrypted PDF document data by the printer driver 1210 and the printer 1230 according to the fourth embodiment.

Mentioned below is an instance when the user encrypts the PDF document data by a document password using the application 120 (Acrobat® or the Acrobat reader®) and specifies an IP address of the printer 1230 on a print screen in the application 120, with the document being still in the encrypted state, to issue a print command.

At this time, the job controller 813 transmits the IP address, being the client information of the PC 1200, a printing notification, and a public key request to the printer 1230 (step S1301).

In the printer 1230 having received the IP address, the printing notification, and the public key request, the secret key creating section 842 creates a secret key unique to the IP address (step S1302). The public key processing unit 843 creates a public key from the secret key and transmits the public key to the PC 800 having issued the request (step S1303). As the timing for creating and transmitting the public key, the public key can be transmitted when the printer 830 becomes ready for printing upon reception of the request, as well as transmitting it immediately upon reception of the request. When the public key is created, the public key processing unit 843 creates the key table in the HDD 149, and registers the created public key and the secret key therein (step S1304).

In the PC 1200, when the host I/F controller 114 receives the public key (step S1305), the document password processing unit 112 issues a display request of the document password input screen, and the job password processing unit 1211 issues a display request of a job password input screen, respectively to the user interface section 113, and hence the user interface section 113 displays the document password input screen and the job password input screen on the monitor 115 (step S1306).

When the user inputs the document password for the encrypted PDF document data and the job password for the print job from the keyboard 116 on the document password input screen, the user interface section 113 obtains the key events. The document password processing unit 112 adds the obtained document password to the encrypted PDF document data as the PJL document password specifying data, and the job password processing unit 1211 adds the obtained job password to the encrypted PDF document data as the PJL job password specifying data (step S1307).

The document password processing unit 112 adds the PJL data to the tail of the encrypted PDF document data added with the PJL document password specifying data and the PJL job password specifying data, and the encryption unit 812 encrypts the three data by the public key (step S1308).

The print data is created from data obtained by encrypting four data, that is, the PJL document password specifying data, the PJL job password specifying data, the encrypted PDF document data, and the PJL data, by using the page description language (step S1309). The created print data is transmitted together with the IP address, being the client information of the PC 800, to the printer 830 by the host I/F controller 114 (step S1310).

Figures 14, 15:
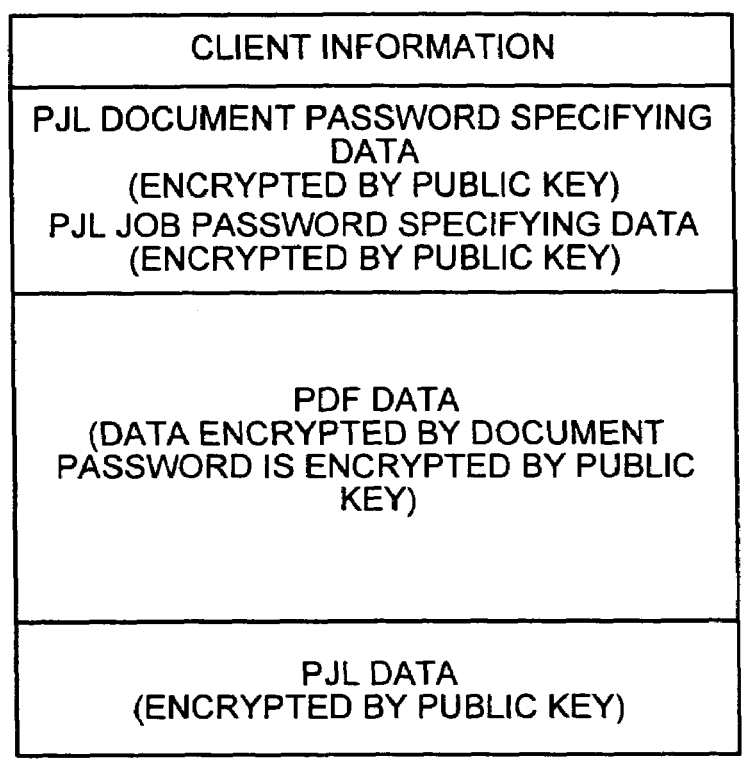
FIG. 14 is a schematic of a structure of a print data created by the printer driver according to the fourth embodiment.
FIG. 15 is schematic of a structure of a print data stored in an HDD in the printer according to the fourth embodiment.

FIG. 14 is a schematic of a structure of a print data created by the printer driver 1210 according to the fourth embodiment. The print data is added with the client information (IP address) at the head, and includes the PJL document password specifying data (encrypted), the PJL job password specifying data (encrypted), the encrypted PDF document data (encrypted), and the PJL data (encrypted). The PJL data may not be added.

In the printer 1230, the host I/F controller 143 receives the print data (step S1311), and the decrypting unit 841 refers to the key table and determines whether the public key corresponding to the client information at the received IP address is valid (step S1312). When the public key is valid, the decrypting unit 542 decrypts the print data by the secret key (step S1313). The data interpretation processing for the decrypted print data is performed (step S1314), and the print data is stored in the HDD 149 (step S1315). The data interpretation processing is performed in the same processing as in the printer controller 140 according to the first embodiment. On the other hand, when the public key is not valid, the decrypting unit 542 annuls the received print data, and does not perform the decryption processing (step S1318).

FIG. 15 is schematic of a structure of a print data stored in an HDD 149 in the printer according to the fourth embodiment. The print data is formed of a file name, the drawing data, the job password, a user ID, and date (the job registered date), and can be searched from the job password, the user ID, the file name, and the date.

Job selection processing for selecting the print data stored in the HDD 149 is performed (step S1316). In the job selection processing, the panel controller 144 displays the job selection screen on the operation panel 148. FIG. 16 is a schematic diagram for illustrating an example of a flow of a job selection screen in the printer according to the fourth embodiment. When the user inputs the user ID, the job password, the date, and the file name, the storage controller 145 searches the print data for the print job that agrees with the input conditions in the HDD 149, and the panel controller 144 displays the content on a job list screen shown in FIG. 16.

When the user inputs the user ID and the job password, all the jobs of the user are displayed on the job list screen. Furthermore, by inputting the file name and the date, only the job corresponding to the specified file name and date is searched in all the jobs of the user, and displayed on the job list screen.

When the user selects a desired job from the job list and touches an OK button, the print controller 146 executes printing for the selected job (step S1317).

In the printer 1230 according to the embodiment, the processing (step S1313) for storing the print data in the HDD 149 is performed after the determination processing (step S1312) of the validity of the key. However, the print data may be stored in the HDD 149 at the time of receiving the print data from the PC 1200, and thereafter, the job selection processing may be performed to determine the validity of the key.

In the printer 1230 according to the embodiment, the processing (step S1313) for storing the print data in the HDD 149 is performed after the data interpretation processing (step S1314), that is, after development to the drawing data. However, the job selection processing may be performed first, and thereafter, the data interpretation processing may be performed.

In the printer driver 810 and the printer 830 according to the fourth embodiment, the print data including the job password for initiating the print job is created and encrypted, and then transmitted to the printer 1230. Therefore, at the time of printing the encrypted application document data, authentication can be performed for each print job in the state with the PDF document data encrypted. Therefore, it can be prevented that the content of the application document data is read or falsified by a malicious system administrator, thereby enabling improvement in security in printing the encrypted document.

In the printer driver 1210 according to the embodiment, the job password is input by the user. However, when the document password is input, the job password processing unit 1211 may create the job password from the document password. In this case, the created job password may be the same as the input document password.

According to the first to the fourth embodiments, printing of the PDF document data has been explained as an example. However, the present invention is applicable not only to the PDF document data, but also to any document data, so long as it is document data encrypted by the application 120.

According to the second to the fourth embodiments, the IP address is used as the client information of the PC, however, any data can be used as the client information, so long as the data can identify the PC, such as an identification number unique to the apparatus.

As described above, according to the present invention, it can be prevented that the content of the application document data is read or falsified by a malicious system administrator, thereby enabling improvement in security in printing the encrypted document.

First key information different for each print job can be obtained, which further improves the security in printing the encrypted document.

Accordingly, it is not necessary to obtain the first key information every time printing is performed, and as a result, there is the effect that printing of the encrypted application document data can be carried out quickly, while improving the security.

Accordingly, at the time of printing the encrypted application document data, authentication can be carried out for each print job, in the state with the application document data encrypted. Therefore, there is the effect that it can be prevented that the content of the application document data is read or falsified by a malicious system administrator, thereby enabling improvement in security in printing the encrypted document.

Accordingly, since the job authentication information required for authentication for each print job can be automatically created from the document authentication information required for encrypting the application document data, the user does not have to input the authentication information many times. Therefore, it becomes convenient for the user.

Accordingly, the job authentication information can be easily created from the document authentication information, and printing of the encrypted application document data can be quickly carried out, while improving the security.

Accordingly, the application document data can be received from the client device in the encrypted state, and the printer side can decrypt the application document data by the document authentication information transmitted at the same time, to perform printing.

Accordingly, the encrypted application document data is transmitted without decrypting the data, with the document authentication information for decrypting encrypted by the second key information.

Accordingly, upon reception of a request, the first key information different for each print job can be transmitted, thereby providing the effect that the security in printing the encrypted document can be further improved.

Accordingly, when there is a time difference from the point in time of receiving the request until starting printing, the first key information can be transmitted at the time of actual printing. Therefore, it can be prevented that a third person can intercept the content of data during the period of from the point in time of receiving the request until starting printing, thereby further improving the security in printing the encrypted document.

Accordingly, processing for obtaining the first key information is not necessary every time when the client device side performs printing, thereby providing the effect that printing of the encrypted application document data can be quickly carried out, while improving the security.

Accordingly, when the first key information is falsified, printing of the encrypted application document data can be prevented beforehand, thereby improving the security.

Accordingly, since the application document data is received from the client device in the encrypted state, with the document authentication information required for decrypting encrypted by the public key information, the content of the application document data can be reliably prevented from being intercepted by a malicious third person on the network. Furthermore, the application document data and the document authentication information can be stored in a recording medium or the like in the encrypted state, until these are decrypted by the printer, using the secret key information. Therefore, it can be prevented that the content of the application document data is read or falsified by a malicious system administrator, thereby enabling improvement in security in printing the encrypted document.

Accordingly, upon reception of a request, the public key information different for each print job can be transmitted, thereby providing the effect that the security in printing the encrypted document can be further improved.

Accordingly, when there is a time difference from the point in time of receiving the request until starting printing, the public key information can be transmitted at the time of actual printing. Therefore, it can be prevented that a third person can intercept the content of data during the period of from the point in time of receiving the request until starting printing, thereby further improving the security in printing the encrypted document.

Accordingly, processing for obtaining the public key information is not necessary every time when the client device side performs printing, thereby providing the effect that printing of the encrypted application document data can be quickly carried out, while improving the security.

Accordingly, decrypting and printing of the application document data by using invalid secret key information, which may have been intercepted by a third person, can be prevented, thereby improving the security.

Accordingly, when the encrypted application document data is printed, authentication can be performed for each print job, with the application document data being encrypted.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable medium encoded with a computer program for a printer driver that transmits print data to a printer connected via a network to make a print request, by causing a computer to execute the steps of:
    acquiring first key information predetermined between the printer and the printer driver from the printer;
    creating second key information using the first key information;
    prompting a user to input document authentication information for decrypting an application document data encrypted by a predetermined application;
    creating print data that includes the encrypted application document data and the input document authentication information;
    encrypting the print data using the second key information; and
    transmitting the print data encrypted and the second key information to the printer.

2. The computer-readable medium according to claim 1, wherein the program causes the computer to further execute the step of making a request for the first key information to the printer.

3. The computer-readable medium according to claim 1, wherein the program causes the computer to further execute the steps of:
    transmitting a connection notification to the printer at the time of being connected to the network; and
    receiving the first key information from the printer after transmitting the connection notification.

4. The computer-readable medium according to claim 1, wherein the program causes the computer to further execute the step of prompting the user to input job authentication information for starting a print job, wherein the print data further includes the job authentication information.

5. The computer-readable medium according to claim 1, wherein the program causes the computer to further execute the step of creating job authentication information for starting a print job from the document authentication information, wherein the print data further includes the job authentication information.

6. The computer-readable medium according to claim 5, wherein the job authentication information created is identical to the document authentication information.

* * * * *